United States Patent [19]

Borona

[11] 4,308,511

[45] Dec. 29, 1981

[54] LOAD MANAGEMENT CIRCUIT BREAKER

[75] Inventor: Russell T. Borona, Seymour, Conn.

[73] Assignee: Westinghouse Electric Corp., Pittsburgh, Pa.

[21] Appl. No.: 110,978

[22] Filed: Jan. 10, 1980

[51] Int. Cl.³ .................... H01H 75/00; H01H 77/00
[52] U.S. Cl. ........................................ 335/14; 307/38; 340/644
[58] Field of Search ............... 335/14; 307/38, 39, 307/40, 41, 143, 140, 139; 340/644, 638, 639

[56] References Cited

U.S. PATENT DOCUMENTS

| 4,023,043 | 5/1977 | Stevenson | 307/38 |
| 4,164,719 | 8/1979 | Young et al. | 335/14 |
| 4,178,572 | 12/1979 | Gaskill et al. | 335/14 |

*Primary Examiner*—Harold Broome
*Attorney, Agent, or Firm*—M. J. Moran

[57] ABSTRACT

A circuit interrupter characterized by a multipole circuit breaker having line and load terminals and conductor means extending between the terminals for each pair of pole terminals, separate pairs of contacts serially connected in the conductor means, receiver means for sensing a control signal from an external source and sending a corresponding power signal to an operator means to effect opening of one of the pair of contacts.

9 Claims, 6 Drawing Figures

LOAD MANAGEMENT CIRCUIT BREAKER

CROSS-REFERENCE TO RELATED APPLICATION

This application is related to the application of J. S. Britton, Ser. No. 878,857, filed Feb. 17, 1978, entitled "A Protective Load Disconnect Unit For Remote Load Control Systems".

BACKGROUND OF THE INVENTION

1. Field of the Invention

This invention relates to a circuit breaker which is susceptible to operation from an external source.

2. Description of the Prior Art

The ability to manage energy requirements is becoming a very viable alternative to increased generating capacity for utility systems. With energy management the utility is capable of controlling its peak demand and possibly reducing it instead of building more generation capacity to meet it. In particular, the ability of a utility to switch individual residential loads during peak demand periods appears to be the direction utilities wish to take instead of fighting the legislative and environmental stumbling blocks facing new utility generation construction.

Prior art patents which are generally related to the subject matter of this invention include the following: U.S. Pat. Nos. 3,319,034; 3,333,078; 4,066,913; 4,127,858; 4,130,874; 4,168,491.

SUMMARY OF THE INVENTION

In accordance with this invention a load management interrupter for use, for example, with a watthour meter for measuring electric power supply is provided in which the interrupter comprises a multipole circuit breaker having line and load pole terminals and conductor means extending between the terminals of each pair of pole terminals, first and second pairs of contacts serially connected in the conductor means, an elongated bimetal member fixedly supported at one end and having the other end free, a magnetic member fixedly supported on the bimetal member intermediate the ends thereof, the releasable latch means having a pivotally supported trip member which is detachably secured to the bimetal member to effect opening of the first pair of contacts, operator means for simultaneously opening the second pair of contacts, receiver means for sensing a control signal from an external source and sending a corresponding power signal to the operator means to effect opening of the second pair of contacts, the external source being a power supply to which a circuit breaker is connected, the operator means including a solenoid operatively connected to the second pair of contacts and comprises a plunger and drive coil means for moving the plunger, spring means for holding the solenoid in a position corresponding to the closed contacts, hold coil means included with a drive coil means for holding the plunger in a contact-open position, and switch means for deactivating the drive coil means when the plunger is in said position.

The advantage of the device of this invention is that actual circuit switching is accomplished in a residential circuit breaker package through the transmittal of telemetry data to a mechanical linkage operating the device.

DESCRIPTION OF THE PREFERRED EMBODIMENT

Figure 1:
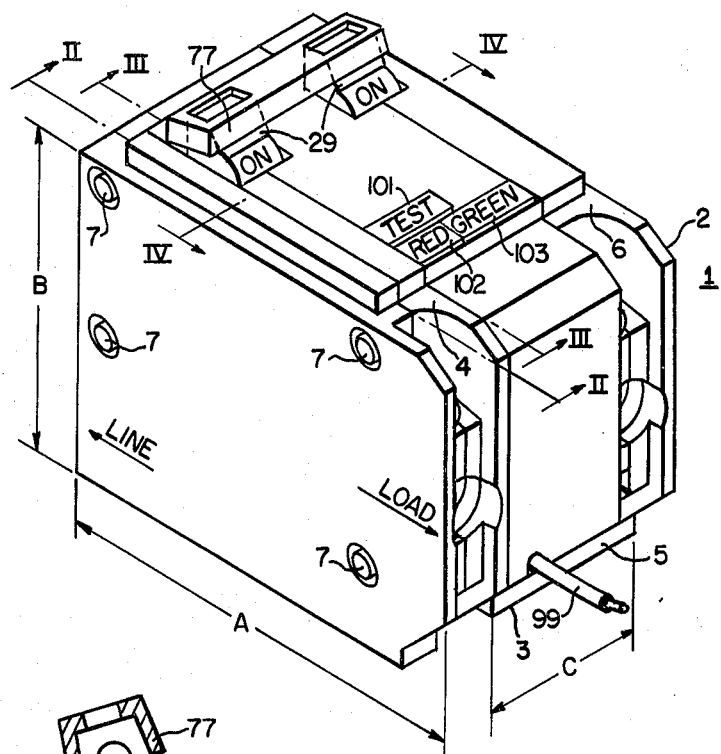
FIG. 1 is an isometric view of a load management circuit breaker of this invention.

A load management circuit breaker structure is generally indicated at 1 (FIG. 1) and it comprises a housing 2 which is composed of an electrically insulating material such as a thermosetting resin. The housing 2 includes a side cover 3, three adjacent trays 4, 5, 6, which are secured together by suitable means such as rivets 7 in a conventional manner.

The load management circuit breaker structure 1 has dimensions of length, height, and width indicated by the arrows A, B, C, respectively. The length A is approximately 3.18 inches; the height B is approximately 2.38 inches; and the width C is approximately 2 inches. Thus, the structure 1 is adapted to fit into the conventional load center box in panel cover. The width of 2 inches also enables the structure 1 to be used with the load center line stabs that are on 1-inch center lines.

The tray 4 (FIG. 4) comprises a back wall 8 which together with the side cover 3 forms a compartment 9. The tray 5 comprises a back wall 10 which together with the back wall 8 forms a compartment 11. Similarly, the tray 6 comprises a back wall 12 which together with the back wall 10 forms a compartment 13. First and second circuit breakers 14, 15 are disposed within the compartments 9, 13, respectively, and a switch mechanism 16 (FIG. 3) is disposed within the compartment 11.

Inasmuch as a detailed description of both circuit breakers 14, 15 is set forth in U.S. Pat. No. 3,786,275, the description is limited to the parts that are essential to the operation of the invention disclosed herein.

The circuit breakers 14, 15 are similar to each other and comprise a stationary contact 21 (FIG. 2), a movable contact 22, a support metal frame 23, an operating mechanism 24, and a trip structure 25. The operating mechanism 24 comprises a contact arm 26 and a releasable member 27 which is pivotally supported at one end thereon on a pivot 28. When the circuit breaker is opened manually, a handle 29 is rotated from the "ON" to the "OFF" position, whereby a contact arm 26 moves the movable contact 22 away from the stationary contact 21 in a conventional manner. The contact arm 26 is electrically connected to the lower end of an elongated bimetal element or bimetal 30 by a flexible conductor 31. The bimetal 30 is part of the trip structure 25 and is secured at its upper end to a flange 32 of the frame 23.

Figure 2:
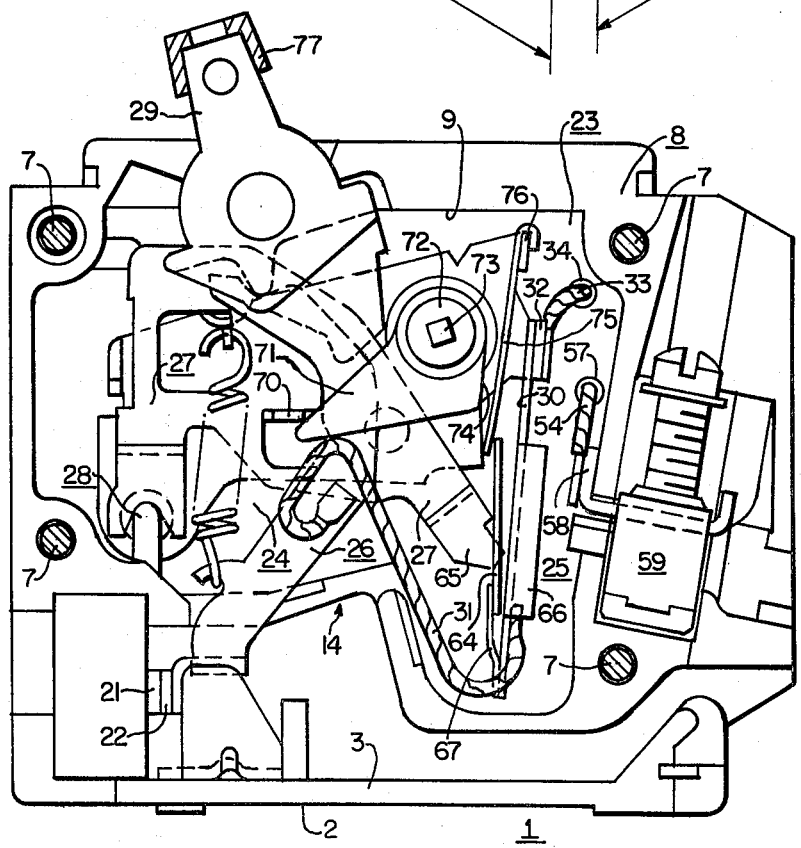
FIG. 2 is a vertical sectional view taken on the line II—II of FIG. 1.
Figure 3:
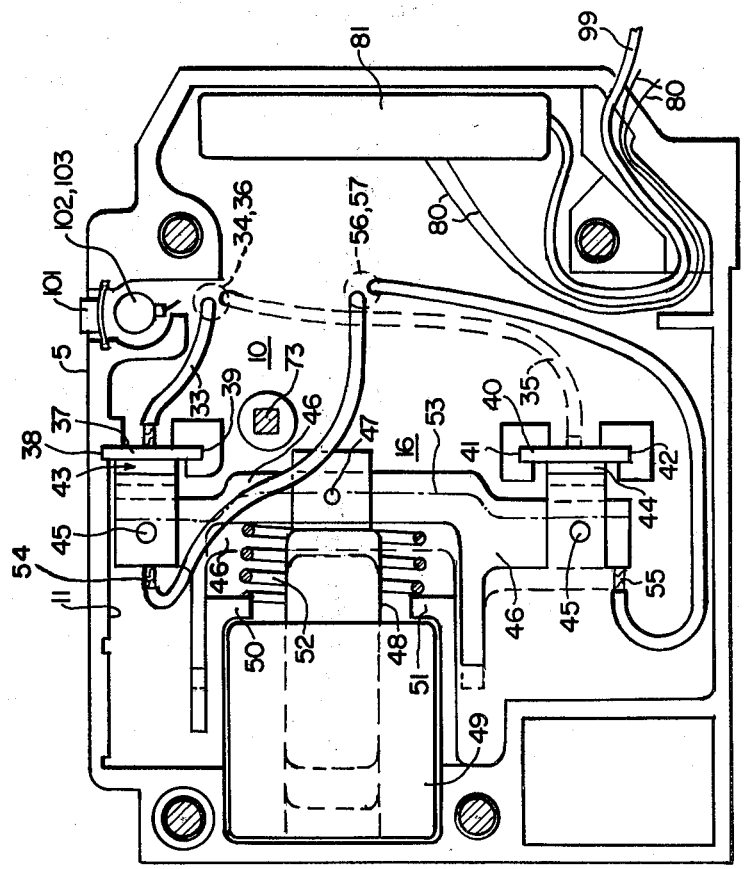
FIG. 3 is a vertical section view taken on the line III—III of FIG. 1.

A flexible line conductor 33 (FIG. 2) extends from the upper end of the bimetal 30 through an aperture 34 in the back wall 8 through which it passes into the compartment 11 to the switch mechanism 16 (FIG. 3).

As was set forth above, the foregoing is a description of the circuit breaker 14 in the compartment 9 (FIG. 2).

In a similar manner, the circuit breaker 15 (FIG. 4) within the compartment 13 has a structure which is identical to that of the circuit breaker 14 and comprises a flexible conductor 35 (FIGS. 3, 4) extending through an aperture 36 in the back wall 10 similar to the aperture 34 in the back wall 8. Both flexible conductors 33, 35 (FIG. 4) enter the compartment 11.

The flexible conductor 33 (FIGS. 3, 5) is electrically connected to a stationary contact 37 which is secured between spaced notches 38, 39 as part of the molded tray 5. Similarly, the flexible cable 35 is electrically connected to a stationary contact 40 which is also secured between spaced notches 41, 42 as part of the molded tray 5.

The movable contacts 43, 44 function with stationary contacts 37, 40, respectively, and are secured by similar pins 45 on a contact mounting arm 46 which, in turn, is centrally secured by a mounting pin 47 on the end of a plunger 48 of a solenoid which include a coil 49. The solenoid including the coil 49 is mounted within a molded portion of the tray 5 including inturned portions 50, 51 and a coil spring 52 is disposed between the portions and the arm 46 for holding the contacts in the closed position as shown. To open the contacts 37, 43 and 40, 44, the coil 49 is actuated for pulling the arm 46 against the spring 52 to the broken line position 53. Though a solenoid is disclosed it is understood that any other electromechanical operator may be used instead, such as a magnetic latch, electromechanical relay, solid-state relay.

Figure 4:
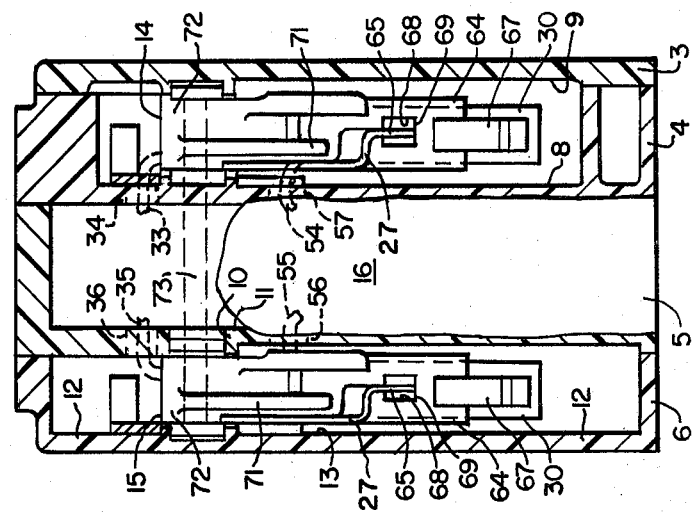
FIG. 4 is a vertical sectional view, partly in elevation, taken on the line IV—IV of FIG. 1.
Figure 5:
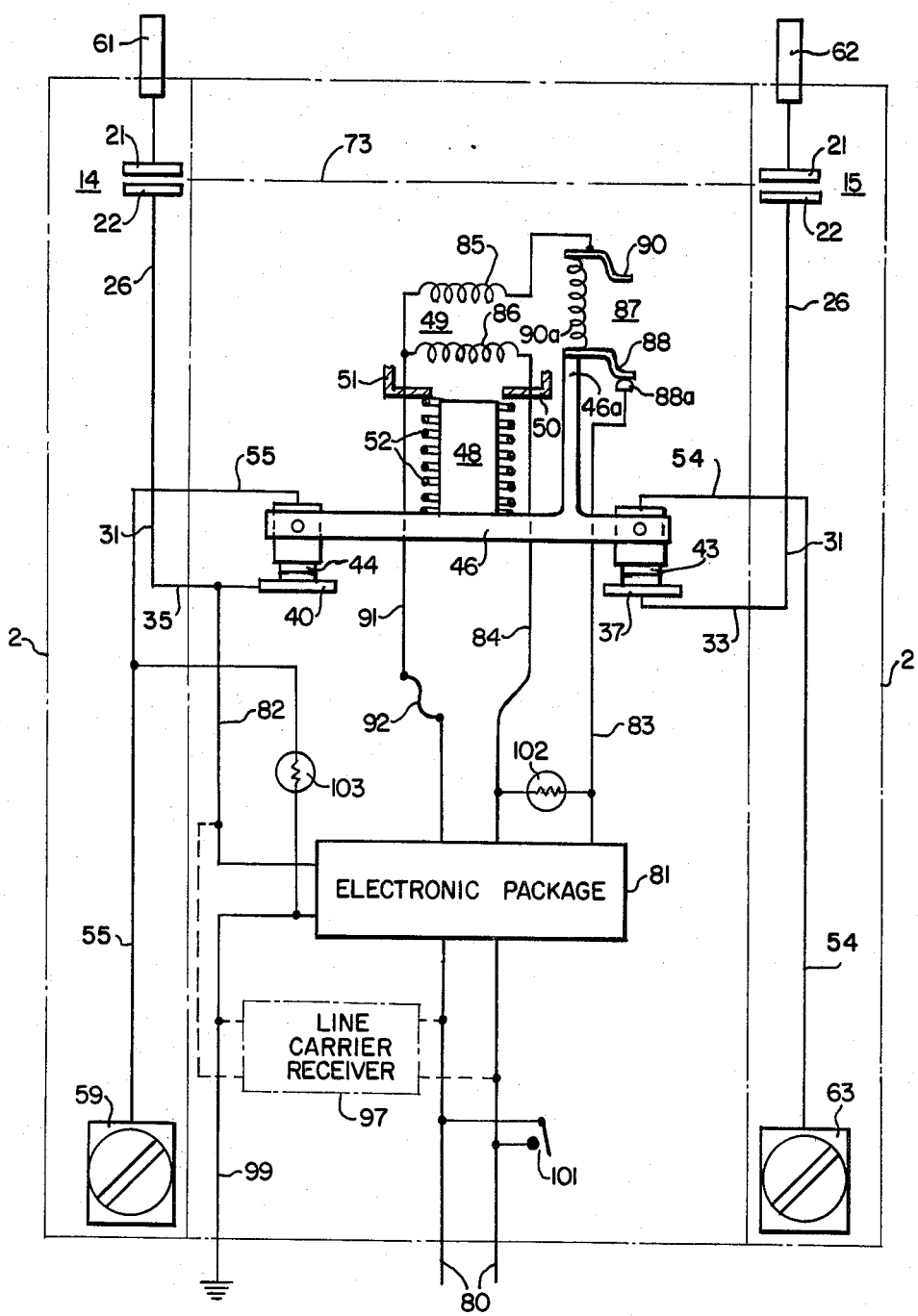
FIG. 5 is a schematic view of the device of this invention.

Flexible conductors 54, 55 extend from movable contacts 43, 44, respectively, to similar apertures 56, 57 (FIG. 4). Each conductor 54, 55 extends to a corresponding terminal assembly, such as shown in FIG. 2, for the conductor 54 which is connected to a terminal strap 58 of a terminal conductor 59. Accordingly, as shown in FIG. 5, a current path for the circuit breaker 14 extends from a line stab 61 through the contacts 21, 22; the conductors 26, 31; the bimetal 30 (FIG. 2); the conductor 35; the contacts 40, 44; the conductor 55, to the load terminal 59. Similarly, the current path for the circuit breaker 15 extends from a line stab 62 through the contacts 21, 22; the conductors 26, 31; the conductor 33; the contacts 37, 43; the conductor 54 to a load terminal 63.

The trip structure 25 (FIG. 2) comprises the bimetal 30, and elongated rigid magnetic armature or latch member 64, an end portion 65 of the releasable member 27, and a magnet 66. The latch member 64 is mounted on the upper end of a flexible metal strip 67, the lower end of which is secured to the lower end of the bimetal 30 in a suitable manner such as a spot weld.

The latch member 64 has an opening 68 (FIG. 4) which includes a latch surface 69 at the base of the opening in the reset position of the circuit breaker as shown in the drawing. The end portion 65 of the releasable member 27 is latched in the opening 68 of the latch member 64, and more particularly is lodged on the latch surface 69. Upon the occurrence of a sustained overload current above a first predetermined value of the bimetal 30, which is heated by the current flowing therethrough, deflects from the position shown to a thermally-tripped position to the right, whereupon the end portion 65 drops from its position on the latch surface 69 to trip the circuit breaker and move the contact 22 to an open position with respect to the stationary contact 21.

The circuit breaker may also be tripped when an overload current above a second predetermined value generates a magnetic force in the magnet 66 to pull the armature or latch member 64 toward it and thereby release the end portion 65 from the opening 68.

Suffice it to say, when one circuit breaker 14, 15 is tripped the other is tripped simultaneously. When one of the circuit breakers 14, 15 is tripped, the releasable member or cradle 27 rotates clockwise about the pivot 28 and a flange 70 moves against a projection 71 of a cam 72 to rotate the cam and a trip bar 73 (FIG. 4) on the other end of which a similar cam 72 with a projection 71 is mounted.

The cam projection 71 at each end of the trip bar 73 also includes a surface 74 which upon counterclockwise rotation of the cam strikes a leaf spring 75, the upper end of which is secured on a flange 76 of the support frame 23. The lower end of the leaf spring 75 is free and is moved by the cam surface 74 against the upper end of the armature 64 to release the end portion 65 from the opening 68. Inasmuch as both circuit breakers 14, 15 have similar cam structures, when either circuit breaker is tripped, the other is tripped in the manner just described. This is commonly referred to as internal common trip or trip free.

In accordance with this invention the circuit through each circuit breaker 14, 15 includes two pairs of separable contacts; namely, for the circuit breaker 14, the contacts 21, 22 and the contacts 40, 44 and for the circuit breaker 15, the contacts 21, 22 and the contacts 37, 43. The two pairs of contacts for each circuit breaker 14, 15 are connected in series. The manner in which the contacts 21, 22 are opened and closed due to current overloads has been set forth above. The same contacts may be opened or closed manually by handles 29 which are joined together by a tie 77 (FIGS. 1, 2) in the conventional manner.

The pairs of contacts 40, 44 and 37, 43 are operated by an external signal independent of the trip structure 25 and the handles 29. To actuate the solenoid coil 49 and open the contacts (FIGS. 3, 5) control is initiated by an external source such as a load management terminal 78 (FIG. 6) associated with a watthour meter 79 connected by control leads 80 to an electronic package 81. Power for the electronic package 81 is received from the conductor 35 through a conductor 82 and a neutral conductor 99 (FIG. 5). An operational amplifier in the electronic package 81 is activated from the control leads 80 and triggers a silicon control rectifier and sends a power signal through separate conductors 83, 84 to the solenoid coil 49. The coil 49 is comprised of a pull coil 85 and a hold coil 86. The pull coil 85 provides initial separation of contact gaps on the contacts 40, 44 and 37, 43. A large amount of power on coil 85 of the solenoid is needed to gain initial mechanical movement. Once the plunger 48 is retracted to open the contacts, less amount of power is needed to hold it open, whereupon the hold coil 86 remains energized.

The advantage of the two-coil system in a device of this size is to reduce operating current needed to maintain the contacts open and to reduce excess heat generated in the solenoid 49. The contact 88 is mounted on an arm portion 46a of the arm 46 and contacts a stationary contact 88a. A flexible conductor 90a extends between the contacts 88, 90 and when the arm portion 46a lifts the contact 88, the pull coil 85 is deenergized. The conductor 84 leads to the hold coil 86. The conductor 83 leads to a switch 87 including contacts 88, 90. Upon movement of the plunger 48 to the seated position, the contacts 88, 90 separate and open the circuit through the pull coil 85, leaving the hold coil 86 energized to maintain the contacts 40, 44 and 37, 43 in the open condition. A return conductor 91 preferably includes a fusible link 92.

Subsequently when the control leads 80 are opened, the hold coil 86 is deenergized and the spring 52 drives the solenoid to the initial condition, whereby the contacts 40, 44 and 37, 43 are closed.

Figure 6:
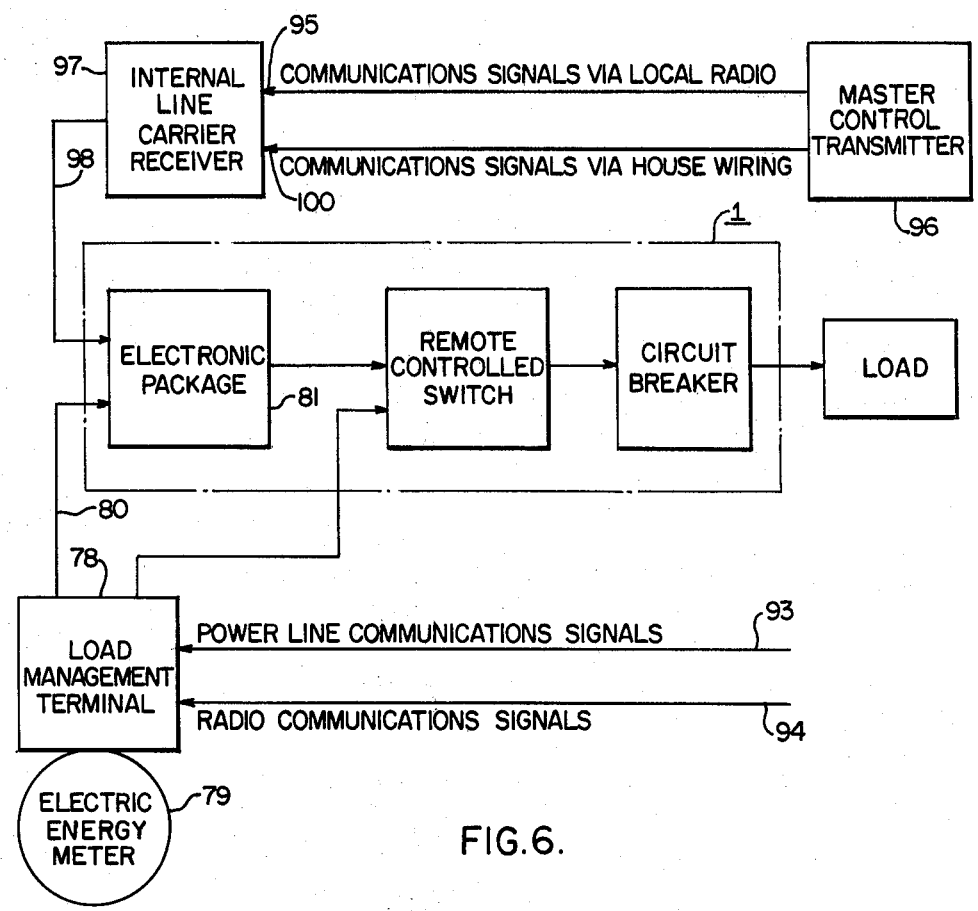
FIG. 6 is a block diagram of a load management control structure in accordance with this invention.

The foregoing sets forth structure and operation for use of a control signal from an external power source which is transmitted by power line communication signals 93 such as shown in FIG. 6. When such signals are transmitted, they are received by the load management terminal associated with the watthour meter 79. Such a meter is provided with an automatic meter reader such as disclosed in U.S. Pat. No. 4,037,219. The load management terminal 78 is generally set forth in U.S. Pat. No. 4,130,879.

Alternative means for transmitting an external control signal to the automatic distribution system of this invention include radio communication signals 94 which are received by the load management terminal 78 and transmitted to the electronic package via control leads 80.

Moreover, alternative signals may include communication signals 95 from a local radio or signals 100 through wiring, such as house wiring or commercial building wiring, which signals may be initiated by a master control transmitter 96 which may be located within the building in which the automatic distribution system may be located. Such signals 95, 100 are received by an internal line carrier receiver 97 which generates a control signal for transmission through a conductor 98 to the electronic package 81. Use of the signals 95, 100 eliminates the control leads 80 where desirable. Receiver 97 may be located within the confines of the device described in FIG. 1.

Finally, test circuits are provided and include a test button 101 with a red indicator 102, as well as a green indicator 103. The red indicator 102 (FIG. 5) lights during the period when the contacts 43, 44 are open and the test button 101 is closed, indicating that external control has occurred. The green indicator 103 lights when the contacts 43, 44 are closed and if an AC voltage exists. The test button 101 enables external testing of the solenoid/contact circuitry when not under direct control and sets up the following electrical logic. The green indicator operates when there is no external control AC voltage present; the test button is not actuated. The red indicator lights when external control is present, or when the test button 101 is actuated, the contacts 43, 44 are open and no AC voltage is present. The green and red indicators operate together when there is external control, or when the test button is actuated, but the contacts are still closed, indicating unit failure.

In conclusion, the automatic distribution system of this invention adapts a commercial or residential circuit breaker technology to energy conservation through remote control electronic packages located inside the device and enables utilities to control individual branch circuits in a residence over the entire distribution system of a utility. The device of the invention is for use with a utility-controlled energy management system for load control, commercial energy management systems, residential conrol systems, or for any application where a circuit protection and relay function would be required in a single package. The device encompasses a circuit breaker which integrally incorporates a relay within the breaker package which can interrupt power via external control. This offers the utility a greater control over peak load demand via time-of-day metering programs in reduced capital expenditures needed for new generation capacity. Finally, the device is not limited to use with current meter line carrier applications; it includes ability to operate with commercial energy management systems through a line carrier.

What is claimed is:

1. A circuit interrupter comprising a circuit breaker having a load terminal, a line terminal, conductor means extending between said terminals and including a first pair of contacts operable to open and close an electric circuit between the terminals, a second pair of contacts serially connected with the first pair of contacts in the conductor means, operator means for opening the second pair of contacts, said operator means including a two parallel connected coil solenoid, wherein both of said coils are energized to open said second pair of contacts, but only one of said coils is utilized to maintain said second pair of contacts in an opened state, receiver means for sensing a control signal from an external source and sending a corresponding power signal to the operator means to effect opening of the second pair of contacts.

2. The circuit interrupter of claim 1 in which the conductor means includes an elongated bimetal member fixedly supported at one end and having the other end free, a magnetic member fixedly supported on the bimetal member intermediate the ends thereof, said first pair of contacts having a latch means associated therewith to effect opening thereof, said latch means having a pivotally supported trip member which is detachably secured to the bimetal member.

3. A circuit interrupter comprising a multipole circuit breaker having line and load pole terminals and conductor means extending between the terminals of each pair of pole terminals, first and second pairs of contacts serially connected in the conductor means, operator means for simultaneously opening the second pairs of contacts, said operator means including a two parallel connected coil solenoid, wherein both of said coils are energized to open said second pair of contacts, but only one of said coils is utilized to maintain said second pair of contacts in an opened state, and receiver means for sensing a control signal from an external source and sending a corresponding power signal to the operator means to effect opening of the second pair of contacts.

4. The circuit interrupter of claim 3 in which each pole of each conductor means includes an elongated bimetal member fixedly supported at one end and having the other end free, a magnetic member fixedly supported on the bimetal member intermediate the ends thereof, said first pair of contacts having a latch means associated therewith to effect opening thereof, said latch means having a pivotally supported trip member which is detachably secured to the bimetal member.

5. The circuit interrupter of claim 4 in which the external source is a power supply to which the circuit breaker is connected.

6. The circuit interrupter of claim 4 in which the external source is transmitted through a current meter.

7. The circuit interrupter of claim 4 having test means for testing the circuitry through said only one of said coils.

8. The circuit interrupter of claim 7 in which the test means comprises a test button and indicator means, and the test button and indicator means being connected in parallel across the solenoid power leads.

9. The circuit interrupter of claim 8 in which second indicator means are connected between one line of the external power supply and neutral.

* * * * *